United States Patent
Chudnovsky et al.

(10) Patent No.: US 7,376,752 B1
(45) Date of Patent: May 20, 2008

(54) METHOD TO RESOLVE AN INCORRECTLY ENTERED UNIFORM RESOURCE LOCATOR (URL)

(75) Inventors: David V. Chudnovsky, New York, NY (US); Gregory V. Chudnovsky, Forest Hills, NY (US)

(73) Assignees: David Chudnovsky, New York, NY (US); Gregory Chudnovsky, New York, NY (US)

( * ) Notice: Subject to any disclaimer, the term of this patent is extended or adjusted under 35 U.S.C. 154(b) by 851 days.

(21) Appl. No.: 10/696,240

(22) Filed: Oct. 28, 2003

(51) Int. Cl.
*G06F 15/16* (2006.01)

(52) U.S. Cl. .................. 709/245; 709/217; 709/219

(58) Field of Classification Search .............. 709/245
See application file for complete search history.

(56) References Cited

U.S. PATENT DOCUMENTS

| | | | |
|---|---|---|---|
| 5,737,560 A | 4/1998 | Yohanan | 395/349 |
| 5,855,015 A | 12/1998 | Shoham | 707/5 |
| 5,862,325 A | 1/1999 | Reed et al. | 395/200.31 |
| 5,864,852 A | 1/1999 | Luotonen | 707/10 |
| 5,869,819 A | 2/1999 | Knowles et al. | 235/375 |
| 5,884,056 A | 3/1999 | Steele | 395/339 |
| 5,892,919 A * | 4/1999 | Nielsen | 709/245 |
| 5,905,248 A | 5/1999 | Russell et al. | 235/462 |
| 5,978,817 A | 11/1999 | Giannandrea et al. | 707/501 |
| 5,991,798 A | 11/1999 | Ozaki et al. | 709/217 |
| 6,041,324 A * | 3/2000 | Earl et al. | 709/219 |
| 6,045,048 A | 4/2000 | Wilz, Sr. et al. | 235/472.01 |
| 6,068,188 A | 5/2000 | Knowles | 235/462.01 |
| 6,078,914 A | 6/2000 | Redfern | 707/3 |
| 6,092,100 A * | 7/2000 | Berstis et al. | 709/203 |

(Continued)

OTHER PUBLICATIONS

"URL Spell Check" Port80 Software. Initial Release Date: Aug. 2002. <http://www.port80software.com/products/urlspellcheck/>.*

(Continued)

*Primary Examiner*—Jason Cardone
*Assistant Examiner*—Jeffrey R Swearingen
(74) *Attorney, Agent, or Firm*—Dov Rosenfeld; Inventek

(57) ABSTRACT

A method and a carrier medium carrying code segments to cause a processor to implement a method for resolving a possibly incorrectly entered URL. The method includes accepting the entered URL, parsing the accepted URL into URL parts, and carrying out a conventional URL lookup. In one embodiment, for any part of the accepted URL that is not valid, the method includes determining a signature for the accepted URL part; and conducting a fuzzy search for at least one valid URL part that is close to the invalid URL part according to a distance measure that combines at least one local measure, each measure suited for a particular type of URL part. At least one valid URL may be formed from the URL parts found in the fuzzy search. In one implementation, the conducting of the fuzzy search includes: determining at least one cluster of a set of pre-formed clusters wherein the accepted URL part is likely to be. Each cluster includes a set of valid URL parts that are close according to a distance measure, and has a representative URL part having a known signature. The determining of the cluster(s) includes finding the at least one signature of representative URLs close to the signature of the accepted URL part. The method includes further searching for a valid URL part within the at least one determined cluster.

26 Claims, 4 Drawing Sheets

U.S. PATENT DOCUMENTS

| | | | |
|---|---|---|---|
| 6,094,665 A * | 7/2000 | Lyons et al. | 707/E17.115 |
| 6,415,282 B1 * | 7/2002 | Mukherjea et al. | 707/3 |
| 6,424,983 B1 | 7/2002 | Schabes et al. | 707/533 |
| 6,434,524 B1 | 8/2002 | Weber | 704/257 |
| 6,438,545 B1 | 8/2002 | Beauregard et al. | 707/6 |
| 6,523,022 B1 | 2/2003 | Hobbs | 707/3 |
| 6,532,444 B1 | 3/2003 | Weber | 704/257 |
| 6,539,396 B1 | 3/2003 | Bowman-Amuah | 707/103 |
| 6,560,634 B1 | 5/2003 | Broadhurst | 709/203 |
| 6,565,504 B2 | 5/2003 | Blumenthal | 600/26 |
| 6,581,034 B1 * | 6/2003 | Choi et al. | 704/238 |
| 6,598,054 B2 * | 7/2003 | Schuetze et al. | 707/103 R |
| 6,952,723 B1 * | 10/2005 | Laiho | 709/219 |
| 6,976,019 B2 * | 12/2005 | Davallou | 707/6 |
| 7,130,923 B2 * | 10/2006 | Mason | 709/245 |
| 2001/0049826 A1 | 12/2001 | Wilf | 725/120 |
| 2002/0006786 A1 | 1/2002 | Mine | 455/414 |
| 2002/0065845 A1 | 5/2002 | Naito et al. | 707/500.1 |
| 2002/0065857 A1 | 5/2002 | Michalewicz et al. | 707/532 |
| 2002/0069220 A1 | 6/2002 | Tran | 707/503 |
| 2002/0078146 A1 | 6/2002 | Rhoads | 709/203 |
| 2002/0156774 A1 | 10/2002 | Beauregard et al. | 707/3 |
| 2002/0156866 A1 | 10/2002 | Schneider | 709/218 |
| 2002/0169749 A1 | 11/2002 | Kageyama et al. | 707/1 |
| 2003/0014450 A1 * | 1/2003 | Hoffman | 707/533 |
| 2003/0050927 A1 | 3/2003 | Hussam | 707/5 |
| 2004/0019697 A1 * | 1/2004 | Rose | 709/245 |

OTHER PUBLICATIONS

Kukich K. Technique for Automatically Correcting Words in Text. 1992. ACM Comput. Surv. 24,4 (Dec. 1992). pp. 377-439. <http://doi.acm.org/10.1145/146370.146380>.*

Ogilvie, Paul et al. "Combining Document Representations for Known-Item Search." SIGIR '03 Proceedings of the 26th annual international ACM SIGIR conference on Research and development in information retrieval. ACM Press. Jul. 2003. 143-150.*

Kang, In-Ho et al. "Query Type Classification for Web Document Retrieval." SIGIR '03 Proceedings of the 26th annual international ACM SIGIR conference on Research and development in information retrieval. ACM Press. Jul. 2003. 64-71.*

"comp.speech Frequently Asked Questions WWW Site", retrieved on Jun. 25, 2007 from <www.speech.cs.cmu.edu/comp.speech>.

"Cluster Analysis", retrieved on Jul. 26, 2003 from <www.statsoftinc.com/textbook/stcluan.html>.

W .Johnson and J. Lindenstrauss: "Extension of Lipschits maps into Hilbert space", *Contemp. Math.*, vol. 26, pp. 189-206, 1984.

Theirry Dutoit: *An Introduction to Text-To-Speech Synthesis*, Kluwer Academic Publishers; 1997.

* cited by examiner

METHOD TO RESOLVE AN INCORRECTLY ENTERED UNIFORM RESOURCE LOCATOR (URL)

BACKGROUND

The present invention relates generally to transactions over a network or internetwork such as the Internet, or a private network (an intranet) and more particularly to a method for resolving an incorrectly entered uniform resource locator (URL).

It is said that the World Wide Web (the "Web") provides access via the Internet to a large number—some say in the order of $10^{10}$—of Web sites and documents. Whatever the actual number, it is large and increasing. In the Web environment, client machines effect transactions to documents, e.g., Web sites on Web servers using the Hypertext Transfer Protocol (HTTP), which is a known application protocol providing users access to files, e.g., text, graphics, images, sound, video, etc., using a standard page description language known as Hypertext Markup Language (HTML) or the later Extensible Markup Language (XML). HTML and XML provide basic document formatting and allows the developer to specify "links" to other servers and files. In the Internet paradigm, a network path to a document or file on a server is identified by a so-called Uniform Resource Locator (URL) having a special syntax for defining a network location. In this description, the term URL includes just the address of a computer in the network, e.g., a domain name. Use of an HTML/XML-compatible browser (e.g., Opera Browser, Netscape Navigator, or Microsoft Internet Explorer) at a client machine involves specification of a link via the URL. In response, the client makes a request to the server where the Web site identified in the link resides (or a duplicate thereof stored elsewhere) and, in return, if the URL is correct, i.e., the request is uniquely resolved, receives in return a document or other object in a display format specified in the HTML or XML of the document specified by the URL.

Typically, a user specifies a given URL manually by typing the desired character string in an address field of the browser. Existing browsers provide some assistance in this regard. For example, modern browsers store URLs that have been previously accessed from the browser during a given time period. Thus, when the user begins entering a URL, the browser performs a "type-ahead" function while the various characters comprising the string are being entered. Thus, for example, if the given URL is "http://www.inventek.com" (and that URL is present in the URL list), the browser parses the initial keystrokes against the stored URL list and provides a visual indication to the user of a "candidate" URL that the browser considers to be a "match". Thus, as the user is entering the URL he or she desires to access, the browser may "look ahead" and pull a candidate URL from the stored list that matches. If the candidate URL is a match, the user need not complete entry of the fully resolved URL; rather, he or she simply actuates the "enter" key and the browser is launched to the site.

URL resolution through this "look ahead" approach has provided some benefits, but the technique is unsatisfactory because the target URL may not be on the saved list.

Alternatively, a portion of the target URL (e.g., the second level domain name) may be saved in the list but the typing error may be a particular directory or file name toward the end of the long string of characters. In either case, the user is forced to enter a long character string, only to find that the string cannot be meaningfully resolved (by a network naming service or a particular Web server, as the case may be).

If the includes an error, a "server not found" error message or the like is returned to the user.

The resolution of the URL occurs at the routers and name servers that are at various location at the Internet (including user's network)—or various location in the private network in the case of a private network—and that maintain tables of Web addresses. A router is a device that forwards data packets along networks based on addresses in the header. A Domain Name Servers (DNS) is a program that that translate domain names that typically are part of a typed URL into IP addresses. Routers and DNSs maintain tables of addresses that provide for resolving a URL.

By a source URL we mean an entered URL, e.g., a possibly incorrectly typed URL. By a valid URL we mean a URL that exists in the network. By the target URL we mean the valid URL of the source URL when correctly entered.

Note that the term URL as used herein includes part of a complete URL specifying a file on a server. Thus, for example, the phrase "a possibly incorrectly entered URL" may mean "a possibly incorrectly entered domain name."

Some techniques have been invented for resolving an incorrectly entered URL. U.S. Pat. No. 6,092,100 to Berstis, et al., titled "METHOD FOR INTELLIGENTLY RESOLVING ENTRY OF AN INCORRECT UNIFORM RESOURCE LOCATOR (URL)" describes a method wherein if a given URL is entered incorrectly at a Web client, a fuzzy URL detection scheme automatically performs a fuzzy search that returns a list of URLs that most closely match what was originally entered into the browser address field. If the fuzzy search does not reveal a match, the browser may contact a server dedicated to performing a broader fuzzy search. In another alternative, the browser contacts a Web server and the fuzzy search is implemented at the Web server in order to return a particular file. The fuzzy search of the unresolved URL is performed against entries of a lexicon stored as an address table that includes candidate URLs, with each URL indexed by a set of N adjacent letters that appear in the URL, and a ranking of how frequently the N adjacent letters appear. N=2 is provided as an example. For each pair of letters, the entry includes a set of at least one of the URLs in the lexicon having a given character pair. The lexicon is based on a history of recently encountered URLs. The search method considers a typed URL or portion thereof, and in that, sets of N adjacent letters, e.g., of two adjacent letters, and generates a frequency table of how often each set of letters appears in the typed URL. That table is compared (ANDed) with the lexicon table generated from the history. The results are ranked to provide a list of likely URLs.

U.S. Pat. No. 6,092,100 to Berstis, et al. is incorporated herein by reference.

The Berstis, et al. method illustrates some problems that exist with much of the prior art. First, the fuzzy search works on letter combinations. There are some typing errors that would never be caught this way. Consider for example a URL devoted to the mathematician Tschebyscheff who is famous for Tschebyscheff polynomials. This name is commonly also spelled as Chebychev, Chebyshev, Chebysheff, and so forth. Similarly, consider for example a Web site devoted to the Russian composer Tschaikovsky. This also is commonly spelled many different ways, and all these different spellings refer to the same object, but have different letter combinations. Similarly, consider the popular donut Krispy Kreme®. There is a Website http://www.krispykreme.com/ dedicated to this brand. A search based on the way the URL sounds is needed to resolve such a URL. For other URLs, e.g., those involving numbers, the numerical closeness of the number rather than letter combinations is likely to lead to the correct answer.

Similarly, some URLs may include sets of "glyphs" that are actually images instead of pure symbols.

Thus, what is needed is a search method that uses different measured of closeness of URLs adapted to different types of URLs and different parts of URLs. Such methods should be able to resolve URLs or URL parts that sound the same, URL, URLs or URL parts that are misspelled based on letter transpositions, as is common in spelling mistakes, URLs or URL parts that are misspelled based numerical closeness, e.g., URL parts that include numbers, and so forth.

Another problem with the Berstis, et al. method and much of the prior art is that to be practical, the prior art methods need to search some relatively finite index or table of possible URLs. A search typically involves forming a signature of the typed URL or part, such as a hash of the URL or part, and then searching a table of hashes of all URLs. A fuzzy search leads to inexact matches, and this in turn involves some concept of closeness or ranking of closeness. Known measures of closeness, e.g., the Berstis, et al. measure of numbers of matching sets of consecutive letters, and other distance measure for closeness of typed strings are typically discrete, e.g., integer-valued measures. Using such measures, it is only practical to carry out a small number of comparisons/closeness determinations. Moreover, hashing is may destroys any "closeness relationship" between strings or numbers, so is not typically usable for fuzzy searched where closeness of strings is important. Hashing can typically be used only for exact matching of a hashed string or a number. Using exact matching on a hierarchy of substrings may require a prohibitively long time, e.g., that varies exponentially with the lengths of strings that are compared. Thus the Berstis, et al. method considers tables of recently accessed Web sites. The inventors assert that it is not practical in real time to conduct such a fuzzy search against all possible URLs. There are said to be in the order of $10^{10}$ URLs in existence. Whatever the actual number, it is clear that it is large and likely to increase as more and more pages are accessible over the Web.

Thus, there also is a need in the art for a practical method for determining an appropriate signature of a typed URLs and fuzzily searching such signature against a very large number of URLs or their signatures.

When string comparisons are used, typically closeness is measured by some integer measure of closeness. Integer measures of closeness do not lend themselves well to many mathematical techniques that have evolved over the years to make fuzzy searches more practical. Thus there is a need in the art for a fuzzy search method for finding a valid URL—e.g., a valid URL part—based on measures of closeness that are not necessarily integer, e.g., that can be computed using floating point arithmetic.

SUMMARY

Described herein are a method and a carrier medium carrying code segments to cause a processor to implement a method for resolving a possibly incorrectly entered URL. The method includes accepting the entered URL, parsing the accepted URL into URL parts, and carrying out a conventional URL lookup. In one embodiment, for any part of the accepted URL that is not valid, the method includes determining a signature for the accepted URL part; and conducting a fuzzy search for at least one valid URL part that is close to the invalid URL part according to a distance measure that combines at least one local measure, each measure suited for a particular type of URL part. At least one valid URL may be formed from the URL parts found in the fuzzy search.

In one embodiment, conducting the fuzzy search occurs at different parts of a computer network according to the type of part that carrying out the conventional URL lookup determines is not valid.

According to one aspect of the invention, the conducting of the fuzzy search includes determining at least one cluster of a set of pre-formed clusters wherein the accepted URL part is likely to be. Each cluster includes a set of valid URL parts that are close according to a distance measure, and has a representative URL part having a known signature. The determining of the cluster(s) includes finding the at least one signature of representative URLs close to the signature of the accepted URL part. The method includes further searching for a valid URL part within the at least one determined cluster.

According to another aspect of the invention, the not-valid accepted URL part includes characters in a first space wherein a distance measure of closeness is integer-valued. The determining of the signature of the accepted URL part includes converting the first space into a second space such that the signature of the URL part is a sequence of values in the second space. The second space is a space wherein the distance measure for comparing signatures of URL parts is non-integer such that cluster analysis can be performed on signatures of valid URLs or URL parts.

In one embodiment, the second space is n-dimensional Euclidean space (or other metric space) such that the signature of the URL part is a sequence of n-dimensional vectors. In yet another embodiment, the values of the converted characters are on the unit sphere such that the second space is transformed to the n+1-dimensional unit sphere, wherein the signature of the URL part is a sequence of n-dimensional vectors on the unit sphere, and wherein calculating the distance between two URL parts can be carried out by a convolution-like operation on the signatures of the two URL parts.

In one embodiment, the local measures include at least one distance measure from the set consisting of a string comparison measure for URL parts for which string comparison is appropriate, a phonetic difference for URL parts for which sound comparison is appropriate, and a numerical difference for URL parts that are numerical and for which numerical comparison is appropriate.

In one embodiment, the local measures include at least one distance measure from the sequences of elements from a metric space, generated from appropriate characters, phonems, and/or glyphs, for which symbol, sound, and/or glyph comparison is appropriate, and where the numerical value of the agreement or disagreement can be evaluated.

Other aspects and features of the invention will be clear from the description herein.

DETAILED DESCRIPTION

Described herein is a method for resolving an possibly incorrectly typed URL by conducting a fuzzy search using a distance measure that combined at least one local measure, each measure suited for a particular part of the URL. The incorrectly typed URL is converted to a signature, and the fuzzy search is conduced on the signature over a set of signatures each representative of a cluster of URLs obtained by carrying out cluster analysis on possible URLs. Once the method identifies at least one cluster where the correct URL may reside, a further search continues within the at least one cluster until at least one candidate URL is identified. An aspect of the invention is converting the space of characters for parts of URLs wherein the distance measure is integer-valued into a space wherein the signatures of parts URLs are sequences of vectors in a multidimensional Euclidean space (or other metric space), and wherein the distance measure for comparing characters and signatures of URL parts is non-integer.

While the method described herein is written in terms of a Euclidean space, those in the art will understand that the method can use another metric space other than Euclidean space, and the term "Euclidean space" will therefore be understood to mean any selected metric space.

Another aspect of the invention is converting the space wherein the signatures of URL parts are sequences of vectors in a multidimensional Euclidean space to a space wherein the signatures of URLs are sequences of vectors that have equal magnitude such that the difference between URL parts can be measured using a computationally simple (and standard) operation.

Implementation in a Network

Figure 1:
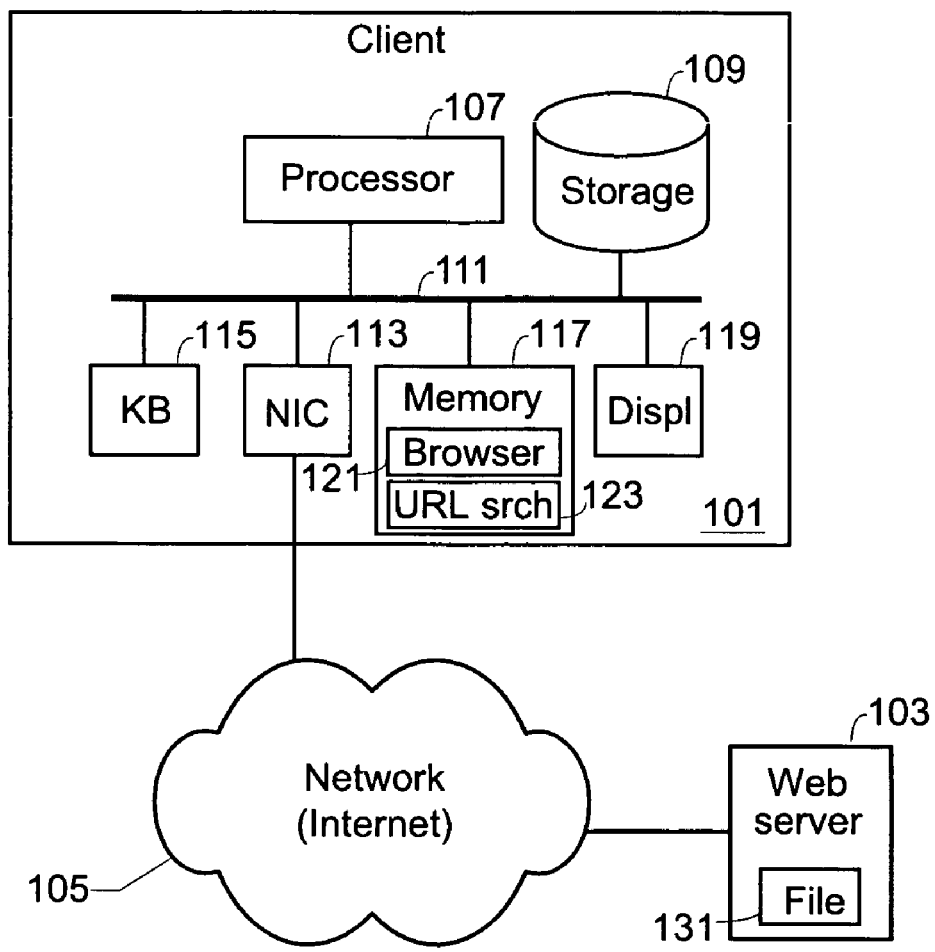
FIG. 1 shows an embodiment of a client system coupled to a network such as the Internet, or an intranet, and which includes an embodiment of the present invention.

The present invention is preferably implemented in a client-server computer network. A representative Web client/Web server that includes an embodiment of the present invention is illustrated in FIG. 1. In particular, a client 101 is connected to a Web server 103 via a network 105. For illustrative purposes, the network 105 is the Internet, and may be a private network (an intranet), an internetwork, an extranet or any other known network connection. Web server 103 is one of a plurality of servers which are accessible by clients, one of which is illustrated by machine 103. A representative client machine includes a processing system of at least one processor 107, a memory subsystem 117, a display subsystem 119, a keyboard 115, local storage 109, and a network interface (NIC) 113 coupling the processor system to the network 105. The elements of the processing system of the client are coupled via a bus subsystem 111 that is shown for the sake of simplicity as a single bus. The client may include more or fewer components as is known.

The Web server 103 also includes a processing system not shown in detail in FIG. 1. The server stores files that each identified by a URL, as is well known. One such file is shown as file 131.

The client 101 includes a browser application 121 shown in FIG. 1 as being in memory 117, although those in the art will understand that not all instructions of the browser may be in memory at the same time, even when the browser is in operation.

The client 101 also includes a set of instructions implementing an embodiment of the invention, namely, the resolution of an incorrectly entered URL. This is shown in memory 117, although those in the art will understand that not all instructions of implementing the embodiment may be in memory at the same time. Furthermore, while FIG. 1 shows the URL finder 123 operating in the client processor, other embodiments of the invention need not operate, and in many cases will not operate on the client processor, but may operator on some other processor coupled to the client, e.g., coupled to the client via the Internet, or coupled to the client via a local area network. It may also be that several method embodiments of the invention may operate at several locations all coupled via the Internet or a local network. Furthermore, a search manager in a processor on the internet may assign at least one task to various processors such that some aspects of the invention may operate remotely on at least one computer system, even in parallel on the computer system(s). How to modify the description herein to so be implemented in a distributed manner would be clear to those in the art.

While the invention is described herein as an determining at least one valid URL for an incorrectly entered URL in a browser application, those in the art will understand that there are many other situations in which an incorrect URL will appear, e.g., as a link in a document, or in a computer program, and so forth. Thus the case of a URL that is incorrectly typed into a URL entry window of a browser application is only one illustrative example. By "accepting" a URL is meant that the method accepts a URL that may be incorrect, e.g., because it was incorrectly types, or is incorrect in a document, or in a program, and so forth.

A Uniform Resource Locators

A Uniform Resource Locator (URL) is the global address of documents and other resources on the Web. The first part of the address indicates what protocol to use, and the second part specifies the IP address or the domain name where the resource is located.

For example, the two URLs ftp://www.pcwebopedia.com/stuff.exe and http://www.pcwebopedia.com/index.html point to two different files at the domain pcwebopedia.com. The first specifies an executable file that should be fetched using the FTP protocol; the second specifies a Web page that should be fetched using the HTTP protocol:

The domain name in a URL is a name that identifies at least one IP address. For example, the domain name microsoft.com represents about a dozen IP addresses. Thus, for example, in the URL http://www.pcwebopedia.com/index.html, the domain name is pcwebopedia.com.

Every domain name has a suffix that indicates which top-level domain (TLD) it belongs to. There are only a limited number of such domains. For example: gov means Government agencies; edu means Educational institutions; org means Organizations (nonprofit); mil means Military; corn means commercial business; net means Network organizations; ca means Canada; uk means United Kingdom, au means Australia; and so forth. Each country further has top level domains. For example, com.uk means commercial business in the uk top-level domain; com.au means commercial business in the Australia top-level domain, and so forth.

Thus, when encountering a URL, a method for resolving the URL includes parsing the URL into its constituent parts. Once the URL is parsed, a conventional URL lookup is performed. For example, because the Internet is based on IP addresses, not domain names, a Domain Name System (DNS) server is used to translate domain names into IP addresses. If a domain name server does not recognize the URL, then according to one aspect of the invention, a fuzzy search is performed to provide at least one "close" URL that is valid. In one embodiment, conducting the fuzzy search occurs at different parts of a computer network according to the type of part for which the conventional URL lookup determines is not valid. For example, it the part if the domain name, the fuzzy search occurs at a part of the network that handles fuzzy domain name searches. Of the domain name is resolved, and the invalidity is found in the file name part of the URL, the fuzzy search may be carried out at the server specified by the domain name.

Future developments of the Internet, including, e.g. IPv6, will make the general framework of addresses (or general requests) resolution described herein even more useful. With 128-bit IP addressing comes the ability to manipulate extended character sets such as Unicode or other 16-bit alphabet symbol sets. NAT (Network Address Translation) allows very complex symbol strings to be included as a part of URL. From that moment on, the URL resolution/comparison/identification becomes a more general problem, well fit for handling by the method described herein.

Comparing URLs

Thus, one aspect of the invention is performing a fuzzy search to provide at least one "close" URL to an incorrectly entered URL. Thus, a definition of "close" is required, i.e., a measure of distance for comparing two URLs.

An aspect of the invention is to use a distance measure that has several components, each for part of the overall URL, and each suited for the type of part. Thus, in one embodiment, we use a global distance measure composed of at least one local distance measure, each local distance measure selected for suitability to the type of part of the URL. Thus, a URL is a string of characters made up of a concatenation of substrings. The following discussion describes how embodiments of the invention use different local distance measures to compare different substrings in a URL. The global distance is a weighted combination of each of the local distances Traditional String Comparisons There are parts of the string that lend themselves to traditional string comparison. One embodiment uses the Hamming distance, denoted $d_H$, as a measure of the similarity between two such substrings, which we will refer to as the source string ($\alpha$) and the target string ($\beta$). Any letters in the source and target strings that are identical and correctly placed each contribute a distance of 0, and any that are different each contribute a distance of 1. Thus, for two substrings denoted $\alpha$ and $\beta$, each of m characters, e.g., $\alpha=\alpha_1 \alpha_2 \ldots \alpha_m$ and $\beta=\beta_1\beta_2 \ldots \beta_3$, the Hamming distance between $\alpha$ and $\beta$ is $$d_H(\alpha,\beta)=\Sigma d_H(\alpha_i,\beta_i),$$

where $d_H(\alpha_i, \beta_i)=0$ if $\alpha_i=\beta_i$ and $d_H(\alpha_i, \beta_i)=1$ if $\alpha_i \neq \beta_i$, i=1, ..., m. In general, the greater the Hamming distance, the more different the strings are.

Other measures the distance between strings also are known, e.g., the Levenshtein distance between $\alpha$ and $\beta$, denoted $d_L(\alpha,\beta)$, which is the number of deletions, insertions, or substitutions required to transform $\alpha$ into $\beta$. For example, if $\alpha$ is "test" and $\beta$ is "test", then $d_L(\alpha,\beta)=0$, because no transformations are needed; the strings are already identical. On the other hand, if $\alpha$ is "test" and $\beta$ is "tent", then $d_L(\alpha,\beta)=1$, because one substitution (change "s" to "n") is sufficient to transform $\alpha$ into $\beta$. In general, the greater the Levenshtein distance, the more different the strings are.

Yet more distance measures also are known based, for example on likely transpositions based on locations on a keyboard for a particular language. For example, in a English language keyboard, "wuick" is close to "quick" because the letters "q" and "w" are adjacent. A "w" however is not next to a "q" on a French language keyboard. The type of keyboard, e.g., language of keyboard 115 used is available to the client machine 101. Such alternate string distance measures are used, for example, in spell checking programs. Yet another string distance measure uses frequency of occurrence of a set of a number, e.g., a pair of letters, as in the above-mentioned incorporated-by-reference U.S. Pat. No. 6,092,100 to Berstis, et al.

Thus, while one embodiment of the invention uses the Hamming distance measured for the distance between substrings for which a string difference measure is appropriate, alternate embodiments of the invention use other different measures, e.g., the Levenshtein distance for the distance between substrings for which a string difference measure is appropriate.

String Comparisons According to Sound

Different parts of the URL are more suitable compared by how they sound to a human listener. For example, in a URL that includes chebychev.com, it is the sound of Chebychev that matters, not the spelling because most people are likely to misspell the word, and for a person searching for the chebychev.com site, there is no way in advance to know how the designer of the Web site chose to write Chebychev. It is said that the famous mathematician himself used several different spellings, depending, for example, on the country of the journal he was publishing in. The Levenshtein distance between Tschebyscheff and Chebychev is large, but these two strings are close indeed. For such substrings, a distance based on phonetic differences is used. To determine such a distance, the substring is first converted to a set of phonemes that describe the sound in the language of the person typing the URL is using. This language an be determined for example, from the setting on the client, e.g., the type of keyboard being used, or from language preferences in the software operating, e.g., the operating system or the browser application operating on the client 101. Furthermore, the language preference may be set by the user. We call such a setting or use of default language as the "language preference." The phonemes are derived from spectral information. Voice synthesis programs are known and translate text string combinations to phonemes that are then translated to sound files that for output by an audio system. Thus it is known how to convert the text to voice. Comparing sounds also is known, and used, for example, in isolated word speech recognition. Each sound is converted to a sound signature, e.g., a feature vector based on spectral components. Often such feature vectors are compressed using vector quantization and it is the feature vector after vector quantization that used as the signature. Two sounds are compared by converting their vector signatures, e.g., by the Euclidean distance between the signature vectors. Alternatively, a purely spectral approach may be used. For example, suppose a function G( ) ("filter") selects the part of the spectrum that is important for human speech perception. Suppose f($\alpha$) and f($\beta$) are the sounds that are generated by the typed substrings $\alpha$ and $\beta$, respectively. Then, one embodiment uses a distance measure that measures the difference between G(f($\alpha$)) and G(f($\beta$)). For example each spectrum part G( ) can be defined by a set of numbers, i.e., a vector, then the vector difference, e.g., a Euclidean distance may be used. Alternatively one can use a comparison between zeroes and poles locations of transforms such as z-transforms of $G(f(\alpha))$, $G(F(\beta))$ in the spectral domain—with the amplitudes at the residues—as a measure of comparison. Alternatively, weighted energy difference of $G(f(\alpha))$, $G(f(\beta))$ can be used as a distance measure, where the weight represents the psycho-acoustic profile of a human listener. Similar comparison distance using vector quantization of features in the image can be used for image comparison. Alternatively, comparing the spectral characteristics of images, e.g., filtered images, using weighted energy difference, e.g., the $L^2$-norm of such images might be more appropriate. This is particularly the case in comparing continuous tone and halftone—e.g., dithered—representation of the same image. Comparison of spectral representations of images is realized using fast DFT implementations, e.g., the FFT, and fast convolutions as is known to those skilled in the art.

In this description, the phonetic distance between two substrings denoted $\alpha$ and $\beta$ is denoted $d_{ph}(\alpha,\beta)$.

For a discussion on voice synthesis, see for example, Theirry Dutoit: *An Introduction to Text-To-Speech Synthesis*, Kluwer Academic Publishers; 1997. See also E. Keller (Editor), *Fundamentals of Speech Synthesis and Speech Recognition*, John Wiley & Sons; 1994. For a discussion of speech recognition, see for example, Lawrence Rabiner, Biing-Hwang Juang, Bilng-Hwang Juang: *Fundamentals of Speech Recognition*, Pearson Education, 1993. See also Allen Gersho and Robert Gray, *Vector Quantization and Signal Comparison*, Kluwer Academic Publishers, 1992 or the of software D. G. Childers: *Speech Processing and Synthesis Toolboxes*, John Wiley & Sons; 2000 (book and CD-ROM of software). See also Claudio Becchetti and Lucio Prina Ricotti: *Speech Recognition: Theory and C++ Implementation*, John Wiley & Sons, 1999 (book and CD-ROM of software). In addition, the Web includes the well known "comp.speech Frequently Asked Questions WWW site" at http://www.speech.cs.cmu.edu/comp.speech/ and various mirror locations that provides a range of information on speech technology, including speech synthesis, speech recognition, speech coding, and related material. The information is regularly posted to the "comp.speech" newsgroup and is known as the "comp.speech FAQ" posting.

String Comparisons for Numerical Parts

When a URL includes a numerical part, it is likely to be the numerical closeness of the numbers that indicates distance rather than some string difference such as the Hamming or the Levenshtein distance. Thus, for $\alpha$ and $\beta$ each a numerical component, the local distance, denoted $d_{num}$ is $$d_{num}(\alpha,\beta)=|\alpha-\beta|.$$

For example, the difference between a part 345 and 355 in the URL is 10.

String Comparisons for Glyphs

Similarly, some URLs may include sets of at least one "glyph." A glyph is actually an image rather than a pure symbol. In this case, similar to sound distances, the distances between glyphs are computed locally, forming the global distances. In one embodiment, each glyph is represented by a two-dimensional (2D) array of pixels, and the distance between two images/glyphs is computed using a measure of the correlation of the 2D pixel arrays that represent the images/glyphs. In other embodiment, the distances between images/glyphs is computed as a combination of pixel-to-pixel differences. In yet another embodiment, a Lowenstein distance of images that allows for deletion or insertion) of pixels is used. Yet another embodiment uses a combination measure.

A measure of the correlation—a convolution-like operation—is particularly well suited for integration into the global distance for URLs that include text. As is described further below, one aspect of the invention is the computation of local distances for text and the like also uses a convolution-like operation. Thus, otherwise very computationally intensive programs that compare various objects using different techniques and codes, can be brought together into unified method of comparison, ranking and signature determination that uses convolution like operations String Comparisons for Known Parts There further are parts of the URL whose spelling is one of a finite set. These include the at least one suffix that indicates which top-level domain (TLD) the URL belongs to. There is a small set of such domains. Thus, for those parts of a URL, the string comparison is only with a top-level domain, and is the Levenshtein distance to the nearest string that is a top-level domain.

The Global Distance

Thus there are a plurality of local distances for each substring of a typed, e.g., mistyped URL.

One embodiment of the invention uses a global distance measure that is a combination of the local distances. Thus, for comparison of a first string A composed of the concatenation of a number Ns of substrings denoted $\alpha_1, \alpha_2, \ldots, \alpha_{Ns}$ with a second string B composed of the concatenation of a number $N_S$ of substrings denoted, one embodiment uses the global distance measure denoted d( ) defined as $$d(A,B)=d_1(\alpha_1,\beta_1)+d_2(\alpha_2,\beta_2)+\ldots+d_{Ns}(\alpha_{Ns},\beta_{Ns}),$$

where $d_1, d_2, \ldots, d_{Ns}$ are the respective appropriate local distances for measuring the difference between the pairs of substrings $(\alpha_1,\beta_1), (\alpha_2,\beta_2), \ldots,$ and $(\alpha_{Ns},\beta_{Ns})$, respectively. The above assumes all local distances are greater or equal to 0.

In an alternate embodiment, each of the local distances are weighted, so that the global distance measure denoted d( ) is defined as $$d(A,B)=\gamma_1 d_1(\alpha_1,\beta_1)+\gamma_2 d_2(\alpha_2,\beta_2)+\ldots+\gamma_{Ns}d_{Ns}(\beta_{Ns},\beta_{Ns}),$$

where $\gamma_1, \gamma_2, \ldots, \gamma_{Ns}$ are positive weighting factors representing different degrees of importance attached to individual sections of substrings with the sum of the weighting factors adding to 1.

Those in the art will understand that other weighting methods are possible, for example, a weighted sum of the square distances, i.e., $$d(A,B)=\gamma_1[d_1(\alpha_1,\beta_1)]^2+\gamma_2[d_2(\alpha_2,\beta_2)]^2+\ldots+\gamma_{Ns}[d_{Ns}(\alpha_{Ns},\beta_{Ns})]^2, \text{ and so forth.}$$

Thus, the global distance is composed of a combination of local distances that are each appropriate for a part of a URL.

Thus, an arbitrary string of text, glyphs and other symbols may be represented as a set of substrings in a URL, wherein substring of a URL is subject to its own recognition/differentiation methods or techniques.

Fuzzy Search Method

In an exact search, the source URL is parsed, and a signature is formed of the source URL components, e.g., of the server name in the source URL. This is carried out typically using a hash function to form an index. A Table of valid URLs is provided, e.g., in a DNS via a router. The hash is used to index the table to determine if the source URL (or part thereof) is one that is known in the table. We call this an exact search. The use of a hashing function on an individual substring typically precludes carrying out a fuzzy search on the individual substring with a distance measure of closeness of the substring to other substrings.

One aspect of the invention is a fuzzy search for finding "close" rather than exact matches of a source URL or part thereof that is possibly incorrect. Another aspect of the invention is forming a signature of the source URL or part thereof in a space where there is a distance measure of closeness that is not necessarily integer valued, and searching for valid URL parts whose signatures are close to that of the source URL part. As described above, the distance measure used in the invention for comparing URLs comprises at least one local distance. The task of the fuzzy search is to find at least one valid URL, consisting of URL parts (or signatures of valid URL parts) close (ideally closest) to the source signature of the source URL (URL parts). This aspect of invention for finding close matches to the URL can be equally applied to a similar fuzzy search for finding close matches of any multistring consisting of plurality of specific fields representing text, Unicode strings, phonems, glyphs, etc., using global distances described herein.

Note that the search for a valid URL from an accepted URL is carried out part-by-part. As an example, the domain name part of the URL is searched for a valid domain name. Then once the domain name is resolved, the "file" part of the URL is searched for from a much more limited set of files—those that are valid on the server (domain name or IP address) specified by the domain name part of the URL. Alternatively, in one implementation, one perform a parallel search for a valid URL using simultaneously multiple searches for individual parts (substrings) of the URL. The resulting set of close matches to the URL is obtained by merging individual sets for substrings. This implementation can take advantage of simultaneous multiprocessing computations/searches.

Cluster Analysis

Given the large number of valid URLs, in the order of in the order of $10^{10}$, it is not practical to run a comparison of the signature of the source URL with those of all possible URLs. Thus, one aspect of the invention is performing a hierarchical search using a clustering method.

The search method assumes cluster analysis is performed on the set of valid URLs or a subset thereof according to signatures of the valid URLs, or parts of URLs, using a distance measure as described herein. Thus, clusters are formed of URLs that are close to each other in the sense of the distance measure. The method includes, for each cluster, determining a representative URL and the signature thereof. After a source URL is entered, its signature is determined and the method searches for the at least one closest representative URL to determine which at least one cluster the target URL of the source URL is likely to be found. The search then continues within each cluster.

Figure 3:
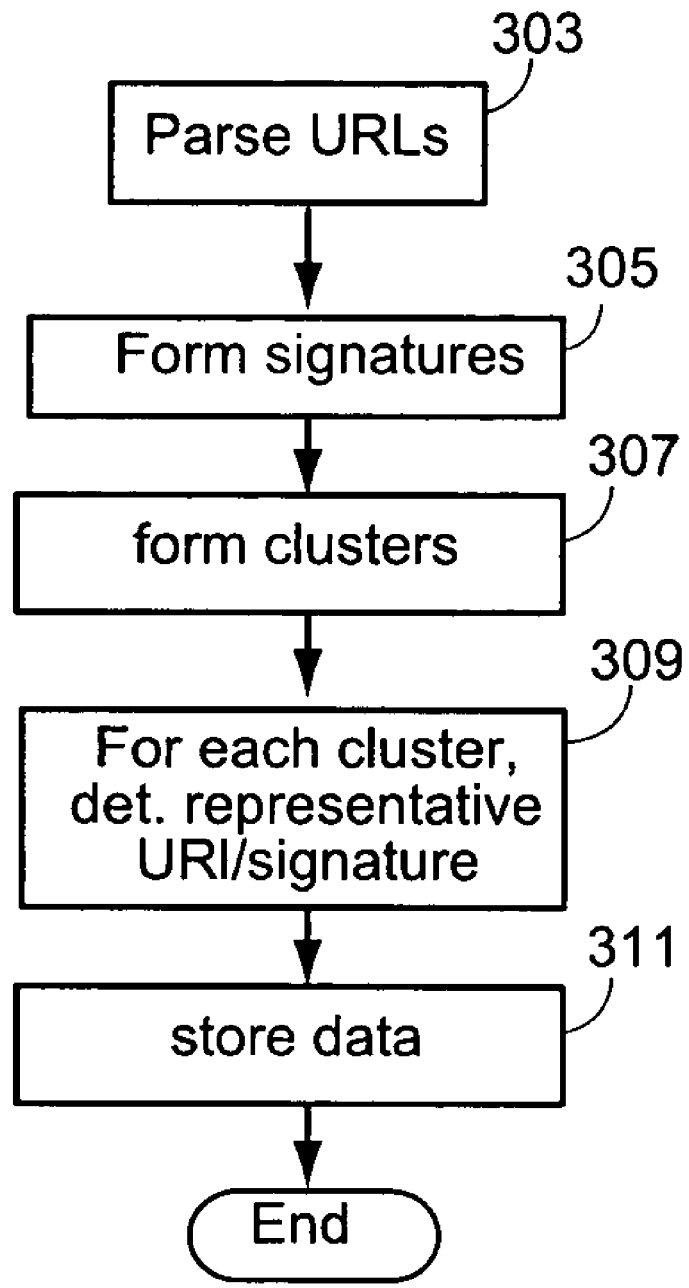
FIG. 3 shows an embodiment of a method of forming clusters of a set of URLs such that each cluster has a representative URL and/or signature thereof.

FIG. 3 describes a flow chart of performing the cluster analysis. This needs to be performed only once, although, from time to time, the data needs to be updated by adding more URLs and deleting no longer valid URLs.

In steps 303 and 305, all the URLs are parsed and their signatures determined. The signatures are determined by the distance measure used, and may include more than one local distance measure. In step 307, clusters are formed of the signatures (and thus of the underlying URLs) according to the distance measure. In step 309, a representative signature (and the associated URL) is determined for each of the clusters. In a step 311, the cluster data is stored.

Cluster analysis is well known. The following books provide resources to the field of cluster analysis: B. S. Everitt, *Cluster Analysis* (3rd edition) Edward Arnold 1993; A. D. Gordon, *Classification*, Chapman and Hall, 1980; P. H. A. Sneath, and R. R. Sokal, *Numerical Taxonomy*, Freeman & Co, 1973; W. Stuetzle, *Data Visualization and Interactive Cluster Analysis*, ICPSR, Ann Arbor, Mich., 1995, Richard O. Duda, Peter E. Hart, David G. Stork, *Pattern Classification* (2nd Edition), Wiley-Interscience; 2nd edition (October 2000). There also is an excellent introduction on the Web at http://www.statsoftinc.com/textbook/stcluan.html.

As described above, many of the distance measures used for string comparison are integer based with combinatorial computations. The cluster analysis methods above when translated into computational methods assume that a non-integer distance measure is used, e.g., one for which floating point arithmetic can be used in computation. Thus, another aspect of the invention is converting the distance measure to a distance measure that is not necessarily integer valued. With such a measure, cluster analysis can be used.

Thus, one aspect of the invention is transforming the first space of all possible characters that make up the URL parts to a second space wherein a distance measure suitable for cluster analysis can be carried out. We call this the URL signature space. In one embodiment, the second space—the URL signature space—is Euclidean space. This converts the problem from a combinatorial problem to a continuous problem wherein solutions are known to exist.

Figure 2:
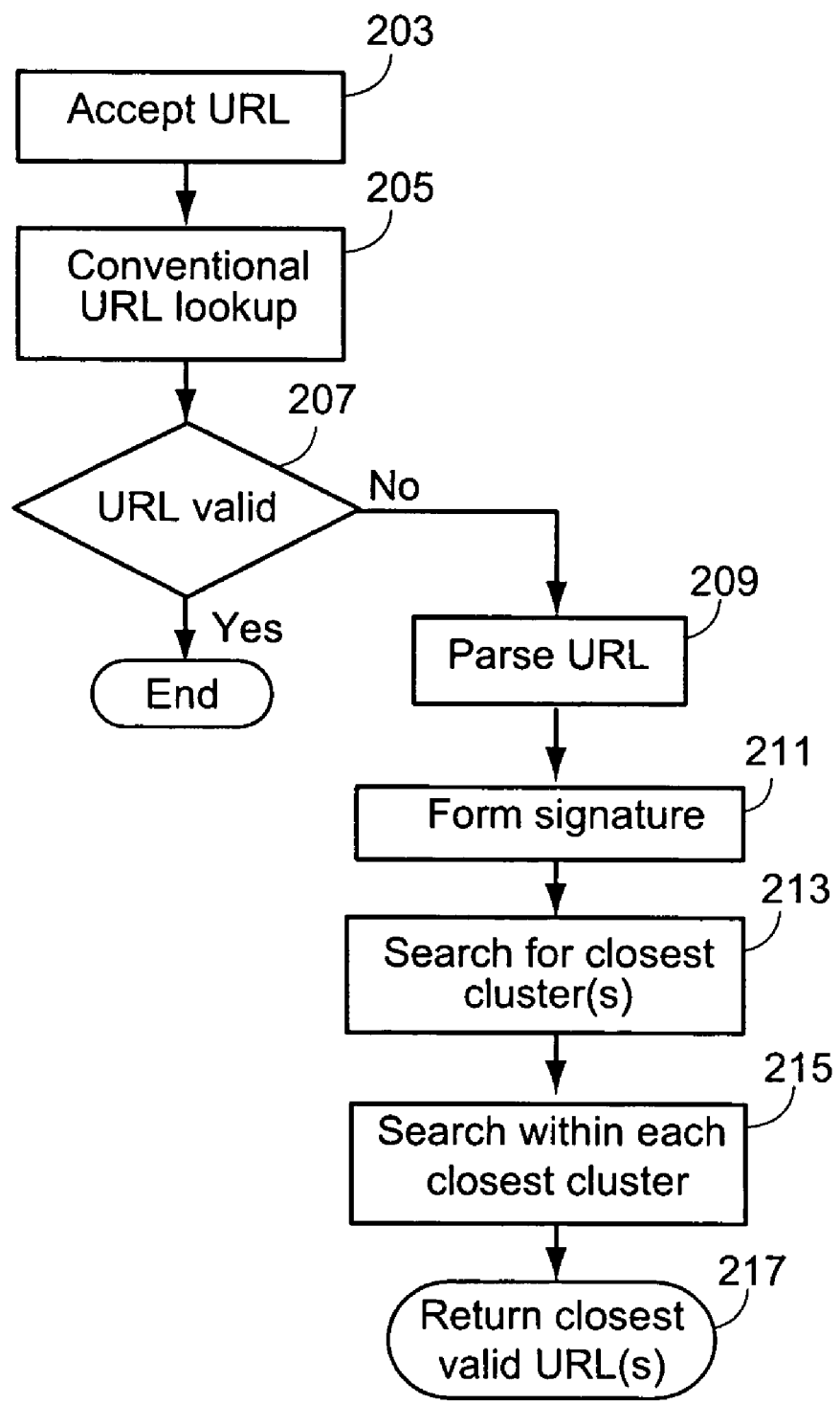
FIG. 2 shows an embodiment of a fuzzy search method that searches for the at least one closest cluster to an accepted URL from of a set of pre-formed clusters.

Another aspect of the invention is converting the second space into a third space wherein string comparisons in the original (first) character space are converted into convolution-like operations (including convolutions and correlations) that are relatively simple to compute FIG. 2 shows a flowchart of an embodiment the overall method that uses cluster analysis. It is assumed that the method of FIG. 3 has been performed so that the set of valid URLs (or subset thereof) has been analyzed into a set of clusters and that there exists a signature for each cluster that is of a representative URL for that cluster.

In a step 203, the URL is accepted. Step 205 uses conventional lookup, e.g., via a DNS, to determine whether or not a valid URL is found. Thus step 205 may include parsing the URL. In 207, the process ends if the source URL is a valid URL. Otherwise, step 209 uses the parsed information from step 205, or if not available, parses the URL into its parts. Step 211 determines the signature of the URL using the URL parts. In a step 213, a search is made for the closest one or several clusters by comparing the signature of the source URL (or source URL part) to the signatures of the URLs that are representative of the clusters. For each URL part, the appropriate distance measure is used. Step 213 ends with at least one likely cluster, or no clusters, i.e., unsuccessful search. An unsuccessful search at this stage is indicated by there being no cluster representative URL found within some predefined threshold of the source URL signature.

Many methods are known for determining the closest representative URLs. One such method used in one embodiment is the nearest neighbor representative URL.

In step 215, a further search is carried out within each of the clusters found in step 213. One embodiment of step 215 looks for the nearest neighbor URL within the cluster.

Another carries out a conventional search within the cluster.

Clustering of "similar" matches can also be achieved using correlation analysis arising from Euclidean vector representation of substrings, described herein together with Principal Component Analysis (PCA) or Independent Component Analysis (ICA), that reduces dimensionality of vectors and signatures, creating a short list of eigenstrings that can be analyzed as representatives of clusters.

It may be that a single level of cluster analysis is insufficient to resolve the source URL within a reasonable amount of time, i.e., that there are still too many URLs within each cluster to carry out distance calculations. In an alternate embodiment, the clusters themselves are subject to a further stage of cluster analysis such that each cluster includes a further set of clusters, with a representative URL and signature there of for each such second-level cluster. Step 215 in such a case includes finding the closest at least one second level cluster, and then carrying out a more detailed search within any found second level cluster(s). The method of the invention can thus be extended to carry out the fuzzy search using any number of levels of hierarchical cluster analysis in order to handle the vast number of possible URLs within a reasonable time.

Thus, according to an aspect of the invention, a fuzzy search request will result in the determination of a particular neighborhood of the space of all valid requests (for a URL that includes at least one string, audio sequence, glyph/image, and so forth). If the initial request is detailed enough in a given class of objects, this neighborhood should be small enough to present with a few choices for action selection, that can be ranked according to appropriate numerical distance measure. It is then very likely that anticipated request will result in the satisfactory outcome (action). If the initial request is less detailed, a large class of objects falls into the determined neighborhood. Even in this case the determined neighborhood will present some answers to the query in the form of some classification of types of objects in it, e.g. by listing sample objects from independent clusters of objects, into which the neighborhood is divided.

Transforming the Character Set Space

This transformations from the first space of the URL character set to the second space wherein floating point distance calculations can be used, and also to the third space wherein distance calculations are relatively computationally simple is now described in more detail.

Let $\Xi$ be the alphabet of all possible characters in a substring of a URL, i.e., of letters, e.g., more than 65,000 letter in the case of Unicode, of phonemes, of glyphs, of numbers, etc.

Denote by d the local distance between two characters for part of a string, wherein the term character is used in a general sense to include phonemes, for a part of a URL wherein sound comparison is used, glyphs with glyphs comparison, or, e.g., Unicode characters in the case of a part of a URL wherein string comparison is used, numbers wherein numerical distance is used, and so forth.

That is, for $\alpha_i$ and $\beta_j$ being characters from $\Xi$, $d(\alpha_i, \beta_j)$ is defined according to the type of part of the URL.

Denote by $\alpha$ and $\beta$ two parts (substrings) of URLs made up of characters from $\Xi$, and denote by $\alpha_i$ and $\beta_j$ the $i^{th}$ and $j$ th characters of $\alpha$ and $\beta$, respectively.

In one embodiment, the distance between parts of URLs $\alpha$ and $\beta$ is defined as follows: Take $\alpha$, shift $\beta$ by k character positions, consider the area of overlap, and add the distances d within the area of overlap. Consider all such sums, and take the minimum. Mathematically, define this as the local distance $d_{loc}$ between substrings $\alpha$ and $\beta$ $$d_{loc}(\alpha, \beta) = \min_k \sum_{i \text{ in overlap area}} d(\alpha_i, \beta_{i+k}).$$

Those in the art will recognize this form as resembling a correlation operation that mathematically is similar to a convolution operation, except that the distance measure d( ) is a non-Euclidean distance measure that also may be different for different types of substrings. Those in the art will also recognize it as a string comparison operation.

An aspect of the invention is transforming the substring alphabet (the first space) denoted $\Xi$ to an n-dimensional Euclidean space (the second space) so that distance measures are easier to compute and such that conventional cluster analysis can be used. Alternatively, the second space can be an arbitrary metric space.

To do this, we introduce a relatively small variation—a "fudge factor" denoted $\epsilon$ by which the distance d may vary. This transforms the space $\Xi$ of characters—Unicode characters, phonemes, glyphs, etc. —into n-dimensional Euclidean space $E^n$ where n is the number of possible values a character may have. A character $\alpha_i$ is now transformed to a vector we denote $_\alpha V_i$, the character $\beta_j$ is transformed to $_\beta V_j$, and so forth. The distance $d(\alpha_i, \beta_j)$ is transformed to the Euclidean distance $\|_\alpha V_i - _\beta V_j\|$, i.e., the vector distance between $_\alpha V_i$ and $_\beta V_j$.

The use of the small possible variation $\epsilon > 0$ is such that $$d(\alpha_i, \beta_j)(1-\epsilon) \leq \|_\alpha V_i - _\beta V_j\| \leq d(\alpha_i, \beta_j)(1+\epsilon).$$

Consider for example, the case of the Hamming distance between $\alpha_i$ and $\beta_j$. Normally this Hamming distance is defined as:

$$d_H(\alpha_i, \beta_j) = 0 \text{ if } \alpha_i = \beta_j \text{ and } d_H(\alpha_i, \beta_j) = 1 \text{ if } \alpha_i \neq \beta_j.$$

When we introduce the small possible variation $\epsilon > 0$, $$(1-\epsilon) \leq d(\alpha_i, \beta_j) \leq (1+\epsilon) \text{ if } \alpha_i = \beta_j, \text{ and } d_H(\alpha_i, \beta_j) = 0 \text{ if } \alpha_i = \beta_j.$$

A further aspect of the invention is transforming the second space wherein a distance measure suitable for cluster analysis can be carried out to a third space wherein not only is there a distance measure suitable for cluster analysis, but wherein computing the distance between sequences of vectors of the third space is relatively computationally simple.

If we restrict all vector lengths of vectors, e.g., $_\alpha V_i$ and $_\beta V_j$ to have a fixed vector magnitude, e.g., 1, then each vector lies on the unit sphere in n+1-dimensional Euclidean space. In such a case, the second space, n-dimensional Euclidean space $E^n$ is transformed into a third space, denoted $S^{n+1}$, the space of n+1-dimensional vectors lying on the n+1-dimensional unit sphere.

How to transform a vector from $E^n$ to $S^{n+1}$ is well known and is done by lifting a point from $E^n$, viewed as a hyperplane, in $E^{n+1}$, to a point on $S^{n+1}$ (just as a point from the plane is projected upwards to a point on the sphere above it). Take $V = (v_1, \ldots, v_n)$ and D large enough that all points V lie within the sphere of radius D: $\|V\| < D$. Then V is projected to $$W = \frac{1}{D}(v_1, \ldots, v_{n+1}), \text{ where } v_{n+1} = D^2 - \|V\|^2 = D^2 - v_1^2 - \ldots - v_n^2.$$

Then W is a point on $S^{n+1}$.

We denote by ${}_\alpha\underline{V}_i$ and ${}_\beta\underline{V}_j$, respectively, the transformed versions of ${}_\alpha V_i$ and ${}_\beta V_j$, respectively, that are on the unit sphere.

In $S^{n+1}$, vector differences become angles whose difference is the inner product, which is relatively straightforward to calculate, e.g., using the Fast Fourier Transform. This, by using the small possible variation, the distance $d(\alpha_i, \beta_j)$ is transformed to vector norm (square) $\|{}_\alpha V_i - {}_\beta V_j\|^2$ in the second space, which is turn is transformed to the inner product, denoted $<{}_\alpha\underline{V}_i, {}_\beta\underline{V}_j>$, in the third space.

The Euclidean space ($E^n$) into which an arbitrary symbol space Ξ is embedded can have dimension significantly smaller than the cardinality Ξ of Ξ.

In an alternate embodiment, if we do not wish to have any distortion ("fudge factor") ε in the string metrics induced by Ξ, then n can be set to Ξ−1 in the real-valued case, or to (Ξ−1)/2 in the complex-valued case. This essentially sets each symbol in Ξ to its own dimension (axis) of $E^n$. However, if one allows for a metrics distortion ("fudge factor") ε, then one can choose n to be not larger than O(log Ξ/ε²). This dimension n is a very slowly changing function of the total bit (logarithmic) size of the symbol set −log Ξ. For example, for standard ASCII alphabet, log Ξ=8 and for the Unicode alphabet, log Ξ=16. There are a variety of embeddings of Ξ into $E^n$ for n=O(log Ξ/ε²). For example, if Ξ is an alphabet, where the distance between different letters is the same, e.g. for non-phonetic matching, then construction of an embedding of Ξ into $E^n$ is reduced to the use of error-correcting codes, either linear or non-linear, where Ξ is embedded into $\{0,1\}^n$, a subset of $E^n$. For a more general Ξ, where there is a non-trivial metric $d(\alpha,\beta)$ for α, β in Ξ, one can use a general Johnson-Lindenstrauss lemma. See W. Johnson and J. Lindenstrauss: "Extension of Lipschits maps into Hilbert space, *Contemp. Math.*, vol. 26, pp. 189-206, 1984. According to the Johnson-Lindenstrauss lemma, for any ε>0, K>1 and n=O(log K/ε²) and any set A={$\underline{V1}, \ldots, \underline{VK}$} in an arbitrary d-dimensional Euclidean space $E^d$, any generic projection p: $E^d \to E^n$ to an n-dimensional subspace $E^n$ "almost preserves" the distance:

$$\|\underline{Vi}-\underline{Vj}\| <= \|p(\underline{Vi})-p(\underline{Vj})\| <= (1+\epsilon)\|\underline{Vi}-\underline{Vj}\| \quad \text{(for any } i,j=1,\ldots,K).$$

This way one can very well approximate nontrivial metric relationships between symbols in Ξ using low-dimensional vectors in $E^n$.

Of course, if there is already an Euclidean metric on Ξ, as is the case for numbers or vectors of numbers, then $E^n$ can be chosen as that Euclidean space.

Now consider the substring (part of a URL) α that has m characters each in the space Ξ. By transforming Ξ into the second space ($E^n$) and then into the third space, e.g., to vectors on the on the n+1'th dimensional unit sphere, i.e., in $S^{n+1}$, the substring α is transformed into a sequence of m vectors on the unit sphere. Denote this transformed substring as ${}_\alpha\underline{V}$. Then $${}_\alpha\underline{V}=[{}_\alpha\underline{V}_1 \; {}_\alpha\underline{V}_2 \cdots {}_\alpha\underline{V}_m],$$

Similarly, the substring β is transformed to $${}_\beta\underline{V}=[{}_\beta\underline{V}_1 \; {}_\beta\underline{V}_2 \cdots {}_\beta\underline{V}_m].$$

Here ${}_\alpha\underline{V}_i$ and ${}_\beta\underline{V}_j$ are vectors in $E^n$ or $S^{n+1}$. The distance between the two substrings $d_{loc}(\alpha,\beta)$ is then:

$$d_{loc}(\alpha_i, \beta_j) = \min_k \sum_{i \text{ in overlap area}} d(\alpha_i, \beta_{i+k}),$$

and $d(\alpha_i, \beta_j)$ is very closely approximated by $\|{}_\alpha V_i - {}_\beta V_j\|^2$ or $<{}_\alpha\underline{V}_i, {}_\beta\underline{V}_j>$. Thus we can closely approximate $d_{loc}(\alpha,\beta)$ by $$\min_k \sum_{i \text{ in overlap area}} \langle {}_\alpha\underline{V}_i, {}_\beta\underline{V}_{i+k} \rangle = \min_k \sum_{i \text{ in overlap area}} correl({}_\alpha\underline{V}, {}_\beta\underline{V})(k).$$

where correl( ) is the correlation operation, which those in the art will recognize as similar to a convolution operation. For the purpose of this invention, all such operations are called convolution-like. Those in the art will also recognize that convolution-like operations on the two transformed substrings can be computed using the fast Fourier transform (FFT), a fast implementation of the discrete Fourier transform (DFT). Such a DFT operation converts a convolution to a multiplication. Other computational efficient variations are known computing a convolution or correlation. By an "FFT" we mean any fast implementation of the discrete Fourier transform (DFT).

To see how computations are carried out, one can look at vectors in $S^{n+1}$. Then one computes $$\sum_i \langle {}_\alpha\underline{V}_i, {}_\beta\underline{V}_{i+k} \rangle.$$

one denotes vectors ${}_\alpha\underline{V}_i$ as $({}_\alpha V_{i,s})_s$ in $E^{n+1}$, then the needed operation reduces to $$\sum_i \sum_s {}_\alpha V_{i,s\beta} V_{i+k,s} = \sum_s \left( \sum_i {}_\alpha V_{i,s\beta} V_{i+k,s} \right)$$

and thus can be computed, e.g. as individual one-dimensional correlations $$\sum_i {}_\alpha V_{i,s\beta} V_{i+k,s}$$

for all the individual (n+1) components of vector arrays ${}_\alpha\underline{V}$ and ${}_\beta\underline{V}$ in $S^{n+1}$. This computation is carried out by means of three FFTs: one for each component arrays $({}_\alpha V_{is})_i$ and $({}_\beta V_{is})_i$ and one inverse FFT for the inverse transform of point-wise multiplication.

Thus, by representing the distance between substrings using Euclidean distance (in the second, Euclidean, space En), or as a spherical distance (in the third space $S^{n+1}$, the (n+1)-dimensional unit sphere), one aspect of the invention provides the ability to perform rapidly distance computations using real or complex numbers and FFT algorithms for fast convolution computations. This is in contrast to traditional algorithms for distance computations that use combinatorial method or dynamic programming that are inherently prohibitively computationally expensive for long strings. See, for example, D. Sankoff, J. and Kruskal, Editors: *Time warps, string edits, and macromolecules: the theory and practice of string comparison*, Addison-Wesley Publishing, 1983. Convolution based algorithms have a computational complexity that is approximately linear in the length of the longest substring being compared. The use of DFT and FFT for convolution computations also allows the creation of signatures of (sub)strings using Fourier coefficients or leading moments in the Euclidean or other metric space representations. Methods of finding the signatures of one and multidimensional arrays and data series would be known to those in the art.

Thus by calculating a signature of part of the URL which is transformed to be a sequence of characters each on the n-dimensional unit sphere, string comparisons are transformed to be operations that are relatively computationally simple. Such simple distance measures can be used for the clustering operation (FIG. 3) and for carrying out the fuzzy search using clusters (FIG. 2).

FIG. 1 shows the URL finder 123 operating in the client processor. The invention, however is not restricted, and in most cases, part or all of the search will be carried out on some other processor coupled to the client, e.g., coupled to the client via the Internet, or coupled to the client via a local area network. For example, the cluster analysis will typically be carried out on some processor ahead of the time of the search. The results of the cluster analysis will be provided to several processors coupled via the network.

Figure 4:
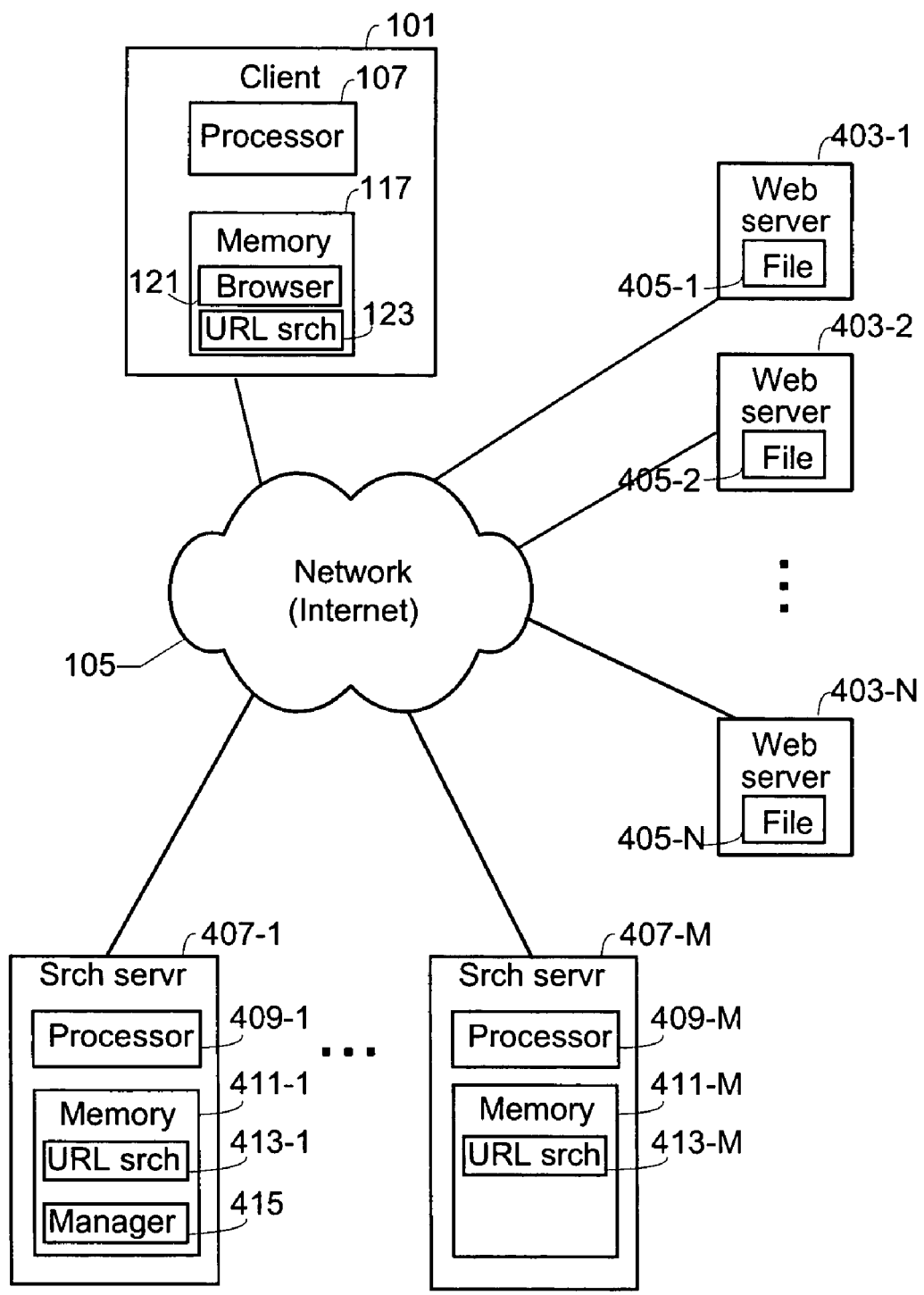
FIG. 4 shows an embodiment of a client system coupled to a network such as the Internet and which includes an embodiment of the present invention operating in a distributed manner.

FIG. 4 illustrates how a fuzzy search scheme may be implemented across multiple components in the computer network. This "distributed" approach is desirable because a given URL error may be present in the domain name portion itself (namely, the IP address part that would be translated by a DNS) or within the portion of the URL identifying particular directory or file within the domain identified by the (correctly-entered) domain name portion. As seen in FIG. 4, at least one of a plurality of Web clients (one such client is shown with reference numeral 101 is coupled to a plurality, say N, of Web servers 403-1, 403-2, . . . 403-N, each of which serves a plurality of files (one such file is shown for each shown server). The client includes a fuzzy URL search 123 for carrying out an embodiment of the method of the present invention, or part thereof. The computer network also includes at least one dedicated server, shown as a number M of servers 407-1, . . . ,407-M, each of which may supports its own fuzzy search engine 413-1, . . . , 413-M, respectively. The servers 407-1, . . . , 407-M each includes a processing system, shown as processors 409-1, . . . ,409-M, respectively, coupled to memory subsystems 411-1, . . . , 411-M, respectively. The fuzzy search engine 413-1, . . . , 413-M are shown as a set of instructions in memory, although those in the art will understand that not all the instructions are in memory at the same time. Thus, for example, an Internet service provider may have its own dedicated server from the set 407-1, . . . 407-M. As used herein, however, a so-called "dedicated" server need not be physically remote from any other device or component. Thus, for example, a given "server" having this function may simply be a new task running in an existing machine. One of the servers is also shown with a set of instructions 415 that manage the operation of the search servers 407-1, . . . , 407-M. The manager may be another processor, as would be clear to those in the art.

It may also be that several method embodiments of the invention may operate at several locations all coupled via the Internet or a local network. Furthermore, a search manager in a processor on the internet may assign at least one task to various processors such that some aspects of the invention may operate remotely on at least one computer system, even in parallel on the computer systems. How to modify the description herein to so be implemented in a distributed manner would be clear to those in the art.

It may be that at some stage of the search, several valid URLs or URL parts are found that are close to the accepted URL or URL part. In such a case, these candidate URL or parts are ranked according to the measure of closeness to the accepted URL or part. In one embodiment, a list of candidate, with their rankings, is presented to the user at the client and the user is prompted to select one of the URLs or parts listed. A test is performed to determine whether the user has made a selection within a given timeout. If not, an error message is displayed. Otherwise, the user selected URL or part is used. For example, the browser is launched to the selected URL. This completes the processing.

One embodiment of each of the methods described herein is in the form of a computer program that executes on a processing system, e.g., at least one processor that are is of a client machine connected to a network, or of a server connect to the network. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries at least one computer readable code segment for instructing a processor of a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in at least one embodiment.

Similarly, it should be appreciated that in the above description of exemplary embodiments of the invention, various features of the invention are sometimes grouped together in a single embodiment, figure, or description thereof for the purpose of streamlining the disclosure and aiding in the understanding of at least one of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Note that the description and claims herein are for resolving a possibly incorrectly entered URL. The term URL as used herein includes part of a URL, e.g., a domain name.

The method described herein for resolving a possibly incorrect URL can be equally applied for a similar fuzzy search on a multi-strings that include, a plurality of fields, representing text, Unicode, strings, phonems, glyphs, . . . , etc.

Note that while the description is in terms of a search of an URL in the Internet, those in the art will recognize that the method is also applicable to other networks such as private intranets.

All publications, patents, and patent applications cited herein that are legally incorporatable be reference are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
accepting a string of characters representing a possibly incorrectly entered URL;
parsing the string into a set of URL parts, a part formed from characters having values in a first space of characters, each part having a corresponding distance measure of closeness for measuring distances between URL parts;
forming a signature of each URL part, forming said signature including, in the case the distance measure of closeness for a URL part in the first space in integer valued, transforming the characters of the URL part whose values are in the first space into characters in a second space such that the distance measure of closeness is transformed to a distance measure of closeness that is not necessarily integer valued;
for each URL part, searching for at least one cluster of a set of pre-formed clusters, the set of pre-formed clusters being clusters of valid URL parts that are close according to the distance measure of closeness that is not necessarily integer valued, each cluster in the set of pre-formed clusters having a representative URL part and signature thereof, the searching using the signature of the URL part;
further searching for a valid URL part within each cluster found in the searching step,
wherein at least one URL part includes one or more non-text non-numerical characters.

2. A method for resolving a possibly incorrectly entered URL comprising:
accepting the entered URL;
parsing the accepted URL into URL parts;
carrying out a conventional URL lookup; and
for any part of the accepted URL that is not valid:
determining a signature for the accepted URL part; and
conducting a fuzzy search for at least one valid URL part that is close to the invalid URL part according to a distance measure that combines at least one local measure, each measure suited for a particular type of URL part,
wherein in the case the not-valid accepted URL part includes characters in a first space wherein a distance measure of closeness is integer-valued, the determining of the signature of the accepted URL part includes converting the first space into a second space such that the signature of the URL part is represented by one or more elements in the second space the second space being a space wherein the distance measure for comparing signatures of URL parts is non-integer or a general distance function in a metric space such that cluster analysis can be performed on signatures of valid URLs or URL parts, and
wherein at least one URL part includes one or more non-text non-numerical characters.

3. The method as recited in claim 2, further comprising forming at least one valid URLs from the URL parts found in the fuzzy search.

4. The method as recited in claim 3 further including the steps of:
displaying a list of formed URLs to a user of a IP client; and
prompting the user of the IP client to select a one of formed URLs in the list.

5. The method as recited in claim 2, wherein each URL part includes characters from a corresponding alphabet, the alphabet being of letters in the case of text, of phonemes in the case of sounds, of glyphs in the case of glyphs/images, and of numbers in the case of a numerical URL parts.

6. The method as recited in claim 2, wherein conducting the fuzzy search occurs at different parts of a computer network according to the type of part that was carrying out the conventional URL lookup determines is not valid.

7. The method as recited in claim 6, wherein the computer network is the Internet.

8. The method as recited in claim 6, wherein the computer network is a private network.

9. The method as recited in claim 2, wherein conducting the fuzzy search includes:
determining at least one cluster of a set of pre-formed clusters wherein the accepted URL part is likely to be, each cluster comprising a set of valid URL parts that are close according to a distance measure and having a representative URL part having a known signature, the determining including finding at least one signature of representative URLs close to the signature of the accepted URL part; and
further searching for a valid URL part within the at least one determined clusters.

10. The method as recited in claim 2, wherein the second space is n-dimensional Euclidean space such that the signature of the URL part is a sequence of n-dimensional vectors.

11. The method as recited in claim 10, wherein the values of the converted characters are on the unit sphere such that the second space is transformed to the n-dimensional unit sphere, wherein the signature of the URL part is a sequence of n-dimensional vectors on the unit sphere, and wherein calculating the distance between two URL parts can be carried out by a convolution-like operation on the signatures of the two URL parts.

12. The method as recited in claim 2, the local measures include at least one distance measures from the set consisting of a phonetic difference for URL parts for which sound comparison is appropriate, and image comparison for URL parts that include glyphs/images for which image comparison is appropriate, and a numerical difference for URL parts that are numerical and for which numerical comparison is appropriate.

13. The method as recited in claim 2, wherein the fuzzy search is performed at a client of a computer network.

14. The method as recited in claim 2, wherein the fuzzy search is performed at a server of a computer network.

15. A computer-readable medium having encoded thereon at least one computer readable code segment for instructing a processor of a processing system, the at least one code segment when executed carrying out a method for resolving a possibly incorrectly entered URL, the method comprising:
  accepting the entered URL;
  parsing the accepted URL into URL parts;
  carrying out a conventional URL lookup; and
  for any part of the accepted URL that is not valid:
    determining a signature for the accepted URL part; and
    conducting a fuzzy search at least one valid URL part that is close to the invalid URL part according to a distance measure that combines at least one local measure, each measure suited for a particular type of URL part,
  wherein in the case the not-valid accepted URL part includes characters in a first space wherein a distance measure of closeness is integer-valued, the determining of the signature of the accepted URL part includes converting the first space into a second space such that the signature of the URL part is a sequence of values in the second space, the second space being a space wherein the distance measure for comparing signatures of URL parts is non-integer or a general distance function in a metric space such that cluster analysis can be performed on signatures of valid URLs or URL parts, and wherein at least one URL part includes one or more non-text non-numerical characters.

16. The computer-readable medium as recited in claim 15, wherein the method further comprises forming at least one valid URL from the URL parts found in the fuzzy search.

17. The computer-readable medium as recited in claim 15, wherein conducting the fuzzy search includes:
  determining at least one cluster of a set of pre-formed clusters wherein the accepted URL part is likely to be, each cluster comprising a set of valid URL parts that are close according to a distance measure and having a representative URL part having a known signature, the determining including finding at least one signature of at least one representative URL close to the signature of the accepted URL part; and
  further searching for a valid URL part within the at least one determined cluster.

18. The computer-readable medium as recited in claim 15, wherein the second space is n-dimensional Euclidean space such that the signature of the URL part is a sequence of n-dimensional vectors.

19. The computer-readable medium as recited in claim 18, wherein the values of the converted characters are on the unit sphere such that the second space is transformed to the n-dimensional unit sphere, wherein the signature of the URL part is a sequence of n-dimensional vectors on the unit sphere, and wherein calculating the distance between two URL parts can be carried out by a convolution-like operation on the signatures of the two URL parts.

20. The computer-readable medium as recited in claim 15, wherein the local measures include at least one distance measure from the set consisting of a string comparison measure for URL parts for which string comparison is appropriate, a phonetic difference for URL parts for which sound comparison is appropriate, and a numerical difference for URL parts that are numerical and for which numerical comparison is appropriate.

21. The computer-readable medium as recited in claim 15, wherein the local measures include one or more distance measures from the set consisting of a string comparison measure for URL parts for which string comparison is appropriate, a phonetic distance for URL parts for which sound comparison is appropriate, a glyph distance between images/icons for parts where it is appropriate, and a numerical distance for URL parts that are numerical and for which numerical comparison is appropriate.

22. A method of conducting a fuzzy search for a source URL part that closely matches a valid URL part, comprising:
  determining a signature for the source URL part;
  determining at least one cluster of a set of pre-formed clusters wherein the source URL part is likely to be, each cluster comprising a set of valid URL parts that are close according to a distance measure and having a representative URL part having a known signature, the determining of the likely clusters including finding at least one signature of representative URLs close to the signature of the accepted URL part; and
  further searching for a valid URL part within the at least one determined cluster
  wherein the source URL part includes at least one a non-text non-numerical symbol.

23. The method as recited in claim 22, wherein in the case the source URL part includes characters in a first space wherein a distance measure of closeness is integer-valued, the determining of the signature of the source URL part includes converting the first space into a second space such that the signature of the URL part is a sequence of values in the second space, the second space being a space wherein the distance measure for comparing signatures of URL parts is non-integer such that cluster analysis can be performed on signatures of valid URLs or URL parts.

24. The method as recited in claim 23, wherein the second space is n-dimensional Euclidean space such that the signature of the URL part is a sequence of n-dimensional vectors.

25. The method as recited in claim 24, wherein the values of the converted characters are on the unit sphere such that the second space is transformed to the n-dimensional unit sphere, wherein the signature of the URL part is a sequence of n-dimensional vectors on the unit sphere, and wherein calculating the distance between two URL parts can be carried out by a convolution-like operation on the signatures of the two URL parts.

26. A method comprising:

accepting a string of symbols representing a possibly incorrectly entered URL, at least one symbol being a non-text non-numerical symbol;

parsing the string into a set of URL parts, a part formed from characters having values in a first space of characters, each part having a corresponding distance measure of closeness for measuring distances between URL parts;

forming a signature of each URL part, forming said signature including in the case that the corresponding distance measure of closeness for the first space for at least one part is integer valued, transforming the characters of the URL part whose values are in the first space into characters in a second space such that the distance measure of closeness is transformed to a distance measure of closeness that is not necessarily integer valued;

for each URL part, searching for one or more clusters of a set of pre-formed clusters, the set of pre-formed clusters being clusters of valid URL parts that are close according to the distance measure of closeness that is not necessarily integer valued, but a general distance function in a metric space, each cluster in the set of pre-formed clusters having a representative URL part and signature thereof, the searching using the signature of the URL part;

further searching for a valid URL part within each cluster found in the searching step.

* * * * *

UNITED STATES PATENT AND TRADEMARK OFFICE
CERTIFICATE OF CORRECTION

PATENT NO.       : 7,376,752 B1
APPLICATION NO.  : 10/696240
DATED            : May 20, 2008
INVENTOR(S)      : Chudnovsky et al.

It is certified that error appears in the above-identified patent and that said Letters Patent is hereby corrected as shown below:

In column 10, line 45 - 46, kindly change "$(\beta_{Ns}, \beta_{Ns})$" to --$(\alpha_{Ns}, \beta_{Ns})$--

In column 15, line 3, kindly change " $W = \frac{1}{D}(v_1, \ldots v_{n+1})$ " to $$-- \quad W = \frac{1}{D}(v_1, \ldots, v_n, v_{n+1}) \quad --$$

Signed and Sealed this

Nineteenth Day of August, 2008

JON W. DUDAS
*Director of the United States Patent and Trademark Office*